A. F. KILBOURNE.
EGG BOILING TIMER.
APPLICATION FILED JULY 31, 1917.

1,297,180.

Patented Mar. 11, 1919.
2 SHEETS—SHEET 1.

WITNESSES
C. F. Rudolph
T. L. Cochrane

INVENTOR
Arthur F. Kilbourne,
BY Victor J. Evans
ATTORNEY

A. F. KILBOURNE.
EGG BOILING TIMER.
APPLICATION FILED JULY 31, 1917.

1,297,180.

Patented Mar. 11, 1919.
2 SHEETS—SHEET 2.

WITNESSES
C. F. Rudolph
T. L. Kochran

INVENTOR
Arthur F. Kilbourne,
BY Victor J. Evans
ATTORNEY

UNITED STATES PATENT OFFICE.

ARTHUR F. KILBOURNE, OF ROCHESTER, MINNESOTA.

EGG-BOILING TIMER.

1,297,180.	Specification of Letters Patent.	Patented Mar. 11, 1919.

Application filed July 31, 1917. Serial No. 183,794.

*To all whom it may concern:*

Be it known that I, ARTHUR F. KILBOURNE, a citizen of the United States, residing at Rochester, in the county of Olmsted and State of Minnesota, have invented new and useful Improvements in Egg - Boiling Timers, of which the following is a specification.

This invention relates to egg timing apparatus and aims to provide means whereby eggs may be boiled for any desired length of time and automatically removed from the boiling water when the proper time has elapsed.

The object of the present invention is to provide an automatic boiling apparatus which may be adjusted for cooking eggs any desired length of time, the removal of the eggs from the boiling water being governed by an adjustable element which is moved to engage the trigger, the said trigger being operated to release a weight, which lifts the eggs from the boiling water at the expiration of the time required.

The invention further contemplates a novel form of locking and releasing means, which is supported upon the water reservoir and operable by a float, so that the said locking and releasing means will be operated to release or lock the egg container when the water has reached the proper level.

With the above and other objects in view, the invention consists of the following novel combination and arrangement of parts, hereinafter more fully described and illustrated in the accompanying drawings, in which Figure 1 is a front elevation of an egg boiler and timing apparatus constructed in accordance with the present invention;

Referring to the drawings in detail, like characters of reference indicate corresponding parts throughout the several views of the drawings.

Figure 1:
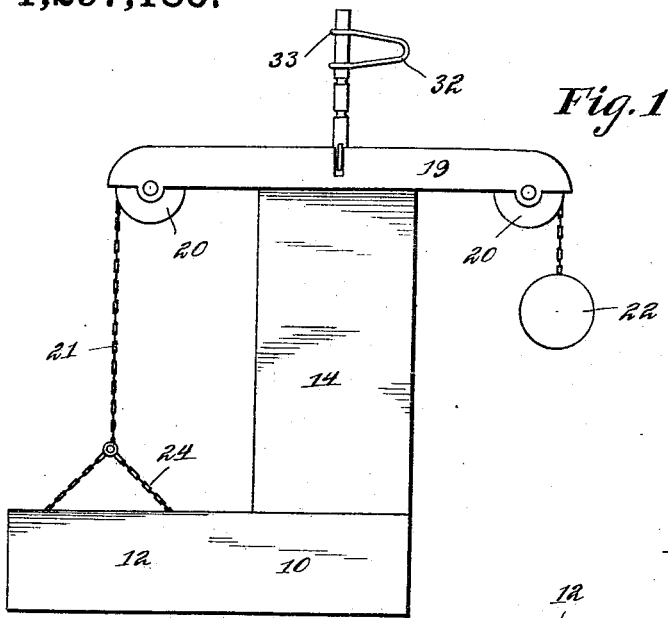
Figure 3:
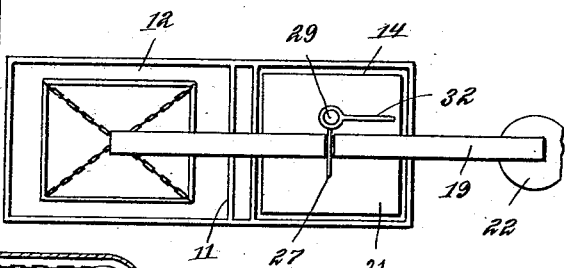
Fig. 3 is a top plan view of the invention.
Figure 2:
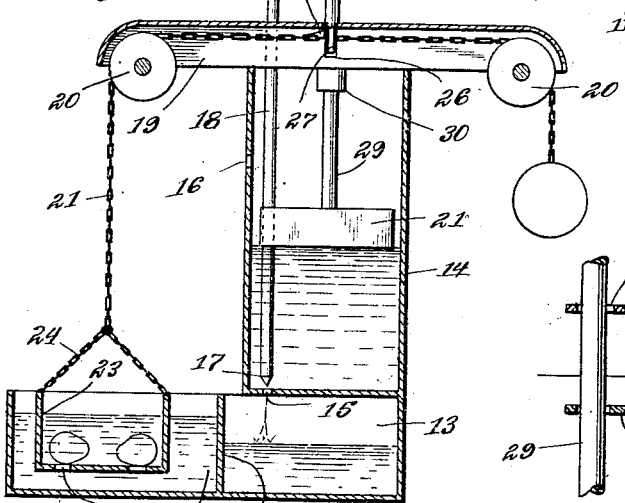
Fig. 2 is a longitudinal sectional view through the apparatus.
Figure 4:
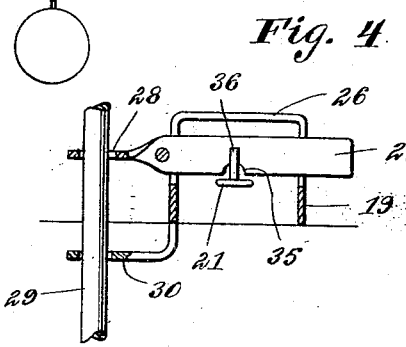
Fig. 4 is an enlarged detailed sectional view showing the manner of engagement of the locking element with the egg supporting means.

In the drawings, there is illustrated a receptacle, which includes a base 10, which is divided by a partition 11 into a boiling receptacle or compartment 12 and a waste water compartment 12. Superimposed upon the base 10 is a reservoir 14, which is provided with a restricted exhaust port 15 and an overflow 16. The reservoir 14 is designed to hold a predetermined quantity of water, the amount being governed by the position of the overflow 16.

The exhaust port 15 is adapted to be closed by means of a valve 17, which is operated by a suitable stem of wire or other material 18, the said stem extending above the top of the reservoir 14 for convenience in operation.

Located upon the top of the reservoir 14 and extending across the same, is an inverted trough like guiding and supporting member 19, which has journaled at each end thereof grooved pulleys 20. Passing over these pulleys and through the trough like guiding and supporting member 19 is a flexible member 21, the said member being provided at one end with a ball or weight 22 and at its opposite end with a container 23, in the form of a rectangular pan. This container is adapted to hold an egg to be boiled and is connected with the flexible member 21 by means of chains 24 and is further provided in the bottom thereof with a plurality of openings 25.

Pivoted upon the member 19 and operating within the slot 26 disposed transversely of the said member 20 is a trigger 27, one end of which is provided with an opening 28, through which is adapted to operate a vertically movable rod 29. The rod 29 is mounted in suitable bearings 30 carried by the reservoir 14 and has secured at one end a float 31, which is operated by the rise and fall of water within the reservoir 14.

The rod 29 has adjustably mounted thereon an adjustable stop 32, formed of spring metal and of substantially U-shape, the ends of the stop being formed into loops 33, each operating over the rod 29, permitting the stop to be set and frictionally engaged with the said rod at any desired point. The rod 29 is further provided with grooves, by means of which the stop may be set at the required position.

The trigger 27 is formed intermediate with an extension 34, which is provided with a notch 35, through which the flexible member 21 is adapted to move and mounted upon this flexible member is a tapered stop 36, the large end of which is adapted to engage the trigger to hold the flexible member 21 against movement under the influence of the weight 22. The stop 36 is so formed however, that when the member 21 is drawn in an opposite direction it will pass through the notch 35 of the trigger so as to automatically set the apparatus.

In the operation of the device, the stop 32 is set on the rod 29 at a point governed by the length of time it is desired the eggs to be boiled. The reservoir 14 is filled with water to the overflow 16. Water is then placed in the compartment 12 and permitted to boil, the eggs then being placed in the boiling water in the container 23, the valve 17 being simultaneously operated to permit of the emptying of the reservoir 14 through the exhaust port 15. The placing of the container 23 within the compartment 12 will automatically set the trigger 27, to lock the container in this position. The emptying of the water will cause the downward movement of the float 21, carrying with it the stop 32 and when the said stop reaches the trigger 27, the flexible member 21 will be released, which, under the influence of the weight 22 will immediately raise the eggs from the compartment 12, the upward movement of the container 23 being governed by the contact of the stop 36 with the pulley which is located upon the weight side of the reservoir.

Figure 6:
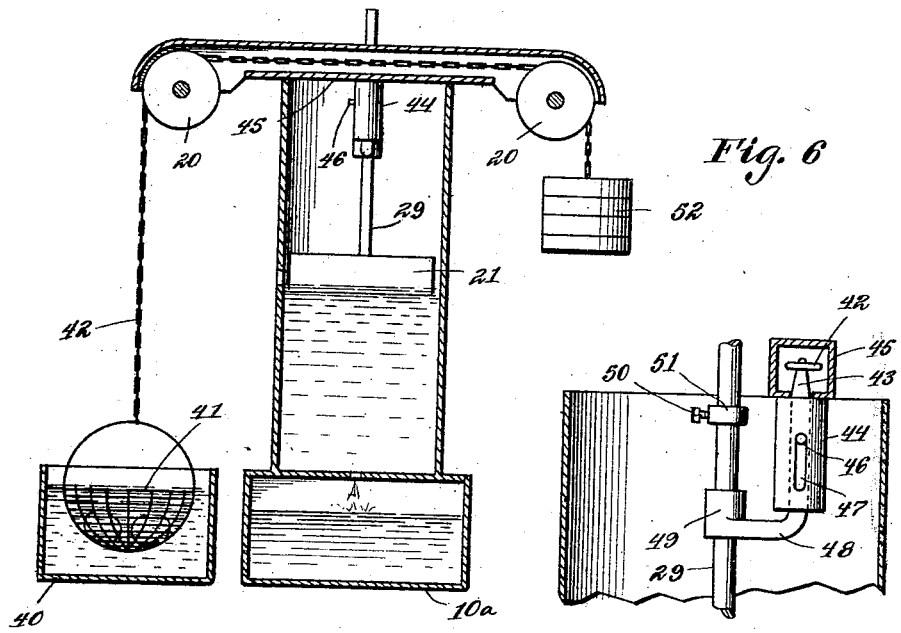
Fig. 6 is a sectional view of a modified form of the apparatus.
Figure 7:
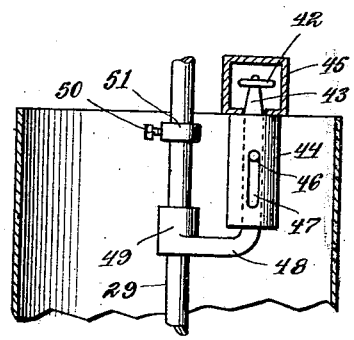
Figs. 7 and 8 are views of a modified form of locking trigger.
Figure 8:
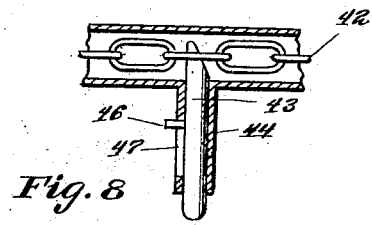
Figure 5:
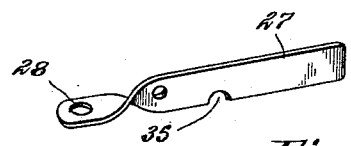
Fig. 5 is a detailed perspective view of the trigger.

In Fig. 6 there is shown a modified form of apparatus, in which the base 10<sup>a</sup> only contains the waste water compartment, the boiling compartment being dispensed with, and any suitable receptacle being utilized for this purpose, for example the pan 40. The container 41 in this form of the invention is in the form of a wire basket and is supported upon the chain 42, which is held against movement by means of a trigger 43, which is slidably movable in a guide 44, secured to and depending from the guiding and supporting member 45. The upper end of this pan is beveled and adapted to engage any one of the links of the chain 42, to hold the receptacle 41 in its adjusted position, the trigger being limited in its movement by means of the pin 46, operating in the slot 47 provided in the guide 44. The trigger is provided with annular extension 48, which carries at its end a tubular member or sleeve 49, through which the rod 29 of the float is adapted to operate. Adjustably mounted upon the rod 29 by means of the set screw 50 is a trip 51, the said trip being adapted to be set at a suitable point throughout the length of the rod for the purpose of engaging the sleeve 49 to release the trigger from the chain, the point at which this is to be set being governed by the length of time the eggs are to be boiled.

In this form of the invention, there is substituted a plurality of weights 52, the number of which is governed by the number of eggs in the container 41, so that the rapidity with which the eggs are removed from the boiling water may be regulated.

Figure 9:
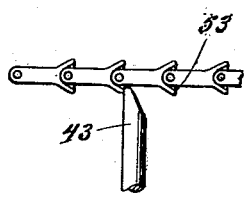
Fig. 9 is a view of a modified form of chain.

In Fig. 9, there is illustrated a modified form of chain, the said chain being provided with projections 53 which are adapted to engage the end of the trigger 43.

It is believed that from the foregoing description when taken in connection with the accompanying drawings, the construction, operation and advantages of the apparatus will be apparent. Various changes in the form, proportion and minor details of construction may be made as will properly fall within the scope of the claims hereto appended.

Having described the invention, what is claimed is:

1. An apparatus of the class described comprising a reservoir, a weight operated member mounted for movement across said reservoir, a container carried by said member, a receptacle positioned to receive said container, an adjustable float operated element and a pivoted element having one end secured to the float operated element and its opposite end removably engages with the weight operated member, whereby said member may be adjustably held against movement.

2. An apparatus of the class described comprising a reservoir, a weight operated member mounted for movement across said reservoir, a container carried by said member, a receptacle positioned to receive said container, a transversely disposed vertically movable trigger carried by the float operated member and located in the path of movement and engageable with said movable member, a float within said reservoir and means carried by said float and engageable with said trigger to release the movable member.

3. An apparatus of the class described comprising a reservoir, a weight operated member mounted for movement across said reservoir, a container carried by said member, a receptacle positioned to receive said container, a pivoted locking element provided with a notch and located in the path of movement of the movable member and a tapered stop carried by said member whereby said member may be engaged in said notch and engageable with said locking element to automatically set the apparatus and hold the weight operated member against movement.

In testimony whereof I affix my signature.

ARTHUR F. KILBOURNE.

Copies of this patent may be obtained for five cents each, by addressing the "Commissioner of Patents, Washington, D. C."